United States Patent [19]
Ierfino et al.

[11] Patent Number: 5,910,965
[45] Date of Patent: Jun. 8, 1999

[54] ADAPTIVE PREDISTORTION USING OVER-THE-HOP FEEDBACK

[75] Inventors: Nick Ierfino, Montreal; Larry Zakaib, Quebec, both of Canada

[73] Assignee: Harris Corporation, Melbourne, Fla.

[21] Appl. No.: 08/496,966

[22] Filed: Jun. 30, 1995

[51] Int. Cl.$^6$ .................................................. H04B 1/62
[52] U.S. Cl. ........................ 375/220; 375/296; 455/69; 455/70
[58] Field of Search ................... 375/296, 285, 375/358, 221, 222, 226, 227, 220; 330/149; 455/63, 69, 114, 115, 116, 126, 70, 71, 68

[56] References Cited

U.S. PATENT DOCUMENTS

| | | | |
|---|---|---|---|
| 4,291,277 | 9/1981 | Davis et al. | 330/149 |
| 4,329,655 | 5/1982 | Nojima et al. | 330/149 |
| 4,453,133 | 6/1984 | Travis | 330/149 |
| 4,580,105 | 4/1986 | Myer | 330/149 |
| 4,993,047 | 2/1991 | Moffatt et al. | 375/261 |
| 5,251,328 | 10/1993 | Shaw | 455/63 |
| 5,291,520 | 3/1994 | Cole | 375/254 |
| 5,309,482 | 5/1994 | Wright et al. | 375/350 |
| 5,515,398 | 5/1996 | Walsh et al. | 375/222 |
| 5,574,982 | 11/1996 | Almgren et al. | 455/69 |
| 5,574,990 | 11/1996 | Flanagan | 455/69 |

OTHER PUBLICATIONS

Eyuboglu, Vedat M., "Detection of Coded Modulation Signals on Linear, Severely Distorted Channels Using Decision–Feedback Noise Prediction with Interleaving", IEEE, vol. 36, No. 4, pp. 401–408, Apr. 1988.

Dodrill et al, "Using Radio Links and Relays", Communications engineering, vol. 14, No. 1, pp. 15–17, Feb. 1954.

*Primary Examiner*—Don N. Vo
*Attorney, Agent, or Firm*—Rogers & Killeen

[57] ABSTRACT

A method and system for predistorting a signal before transmission of the signal to compensate for nonlinearities introduced when the signal is transmitted to a receiver. A signal received on a first frequency is evaluated at a receiver to determine whether the received signal includes nonlinearities without comparing the received signal to the original signal or a pilot tone. The nonlinearity data that result from the evaluation are transmitted back to the originator of the signal on a second frequency where the nonlinearity data are used to predistort signals before transmission therefrom. Communication of the nonlinearity data between transmitter and receiver at each site is through a reverse channel which is further controlled by a serial line.

21 Claims, 2 Drawing Sheets

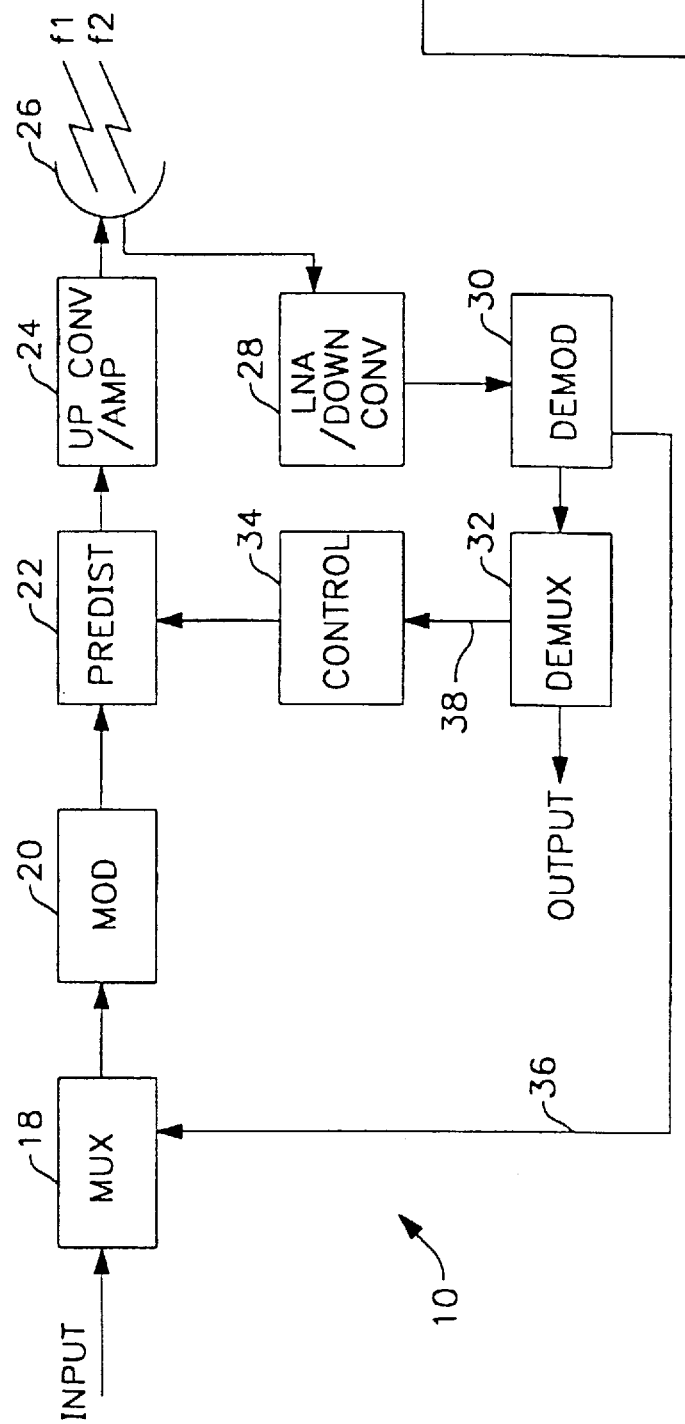

ADAPTIVE PREDISTORTION USING OVER-THE-HOP FEEDBACK

BACKGROUND OF THE INVENTION

The present invention is directed to systems and methods for adaptive equalization of signals in communication systems, and more particularly to a system and method in which a received signal is evaluated without reference to an input signal to determine whether nonlinearities are present and to provide information for correcting the nonlinearities.

Nonlinearities in communication system components can distort a communicated signal so that the signal's bit error rate (BER) may be unacceptably degraded. For example, power amplifiers have nonlinear amplitude modulation to amplitude modulation (AM/AM) and amplitude modulation to phase modulation (AM/PM) conversion characteristics which can distort signals passed therethrough. This problem and several potential solutions are discussed in U.S. Pat. No. 4,291,277 that is incorporated by reference.

One method of correcting nonlinearities in a signal is to predistort the signal before it is processed for transmission in order to compensate for nonlinearities that are introduced during processing. A predistortion correction is typically determined by comparing an input signal to an output signal, and feeding back the determined differences to correct the input signal. The correction of the nonlinearities may be adaptive so that the corrections change as the nonlinearities change, such as discussed in the above referenced patent.

However, such methods typically require that a copy of the input signal be preserved for comparison to the output signal and typically include a shift register or other delay mechanism for this purpose. Other systems may use a pilot tone as an ersatz for the input signal. It would be desirable to avoid the comparison of the input signal to the output signal and eliminate this delay, and to avoid the use of pilot tones which can decrease available bandwidth.

The present invention relies on characteristics of the received signal that indicate when nonlinearities are present, without resorting to comparison to either the input signal or a pilot tone and without the delays attendant therewith. Thus, with the present invention nonlinearities may be determined at any place in the system without reference to an input or pilot signal.

Accordingly, it is an object of the present invention to provide a novel method and system for compensating for nonlinearities in a communication system that avoids comparisons to other signals and thereby obviates the problems of the prior art.

It is another object of the present invention to provide a novel method and system for compensating for nonlinearities introduced when a signal is transmitted in which characteristics of a transmitted signal are evaluated to determine whether the signal includes nonlinearities.

It is yet another object of the present invention to provide a novel method and system for compensating for nonlinearities introduced when a signal is transmitted in which characteristics of a signal are evaluated at a receiver, without resort to the originally transmitted signal or pilot tone, and the results of the evaluation are sent back to the transmitter for predistortion of signals transmitted therefrom.

It is still another object of the present invention to provide a novel method and system for predistorting an RF signal to compensate for nonlinearities introduced when the RF signal is communicated on a first frequency in which nonlinearity corrections are generated at a receiver and provided to a collocated transmitter through a reverse channel connection for transmission back to the original transmitter on a second frequency.

It is a further object of the present invention to provide a novel method and system for predistorting an RF signal to compensate for nonlinearities introduced when the RF signal is communicated in which nonlinearity corrections are provided back to the original transmitter that includes a predistorter connected to a collocated receiver through a reverse channel connection.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a block diagram of an embodiment of the present invention.

FIG. 2 is an illustration of the constellation point space.

DESCRIPTION OF PREFERRED EMBODIMENTS

Figure 3:
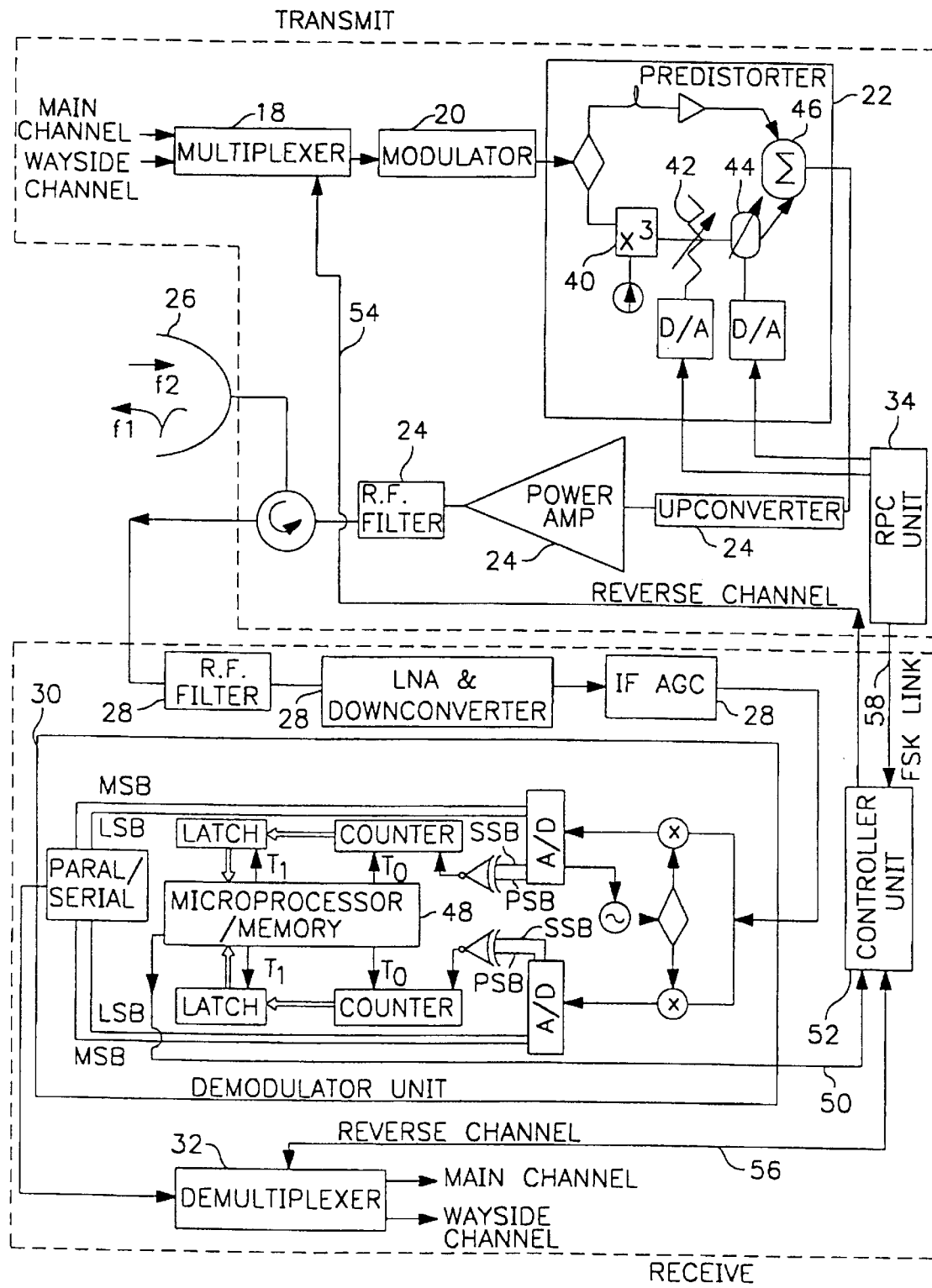
FIG. 3 is a partial block and partial circuit diagram of a further embodiment of the present invention.

With reference now to FIG. 1, an embodiment of the present invention may include a plurality of transmitter/receivers 10 for communicating signals in a communication system. Each of transmitter/receivers 10 may include a multiplexer 18 that accepts one or more input signals and converts the input signals to a single serial stream of data bits, a modulator 20 that modulates the stream for spectral efficiency, a predistorter 22 that predistorts the stream responsive to a correction discussed below, and an upconverter and power amplifier 24 that upconverts the stream to appropriate transmission frequency, and amplifies and filters the signal as needed for transmission on antenna 26.

A low noise amplifier and downconverter 28 returns the received signal to an intermediate frequency, a demodulator 30 demodulates the IF spectrum into data and clock, a demultiplexer 32 regenerates digital data, and a controller 34 provides a nonlinearity correction to predistorter 22. Transmitter/receivers 10 need not be identical.

Operation of the present invention may be understood by considering transmission of an input signal from a first transmitter/receiver 10 to a second transmitter/receiver 10. At the first transmitter/receiver 10 an input data stream may be separated into in-phase (I) and quadrature phase (Q) components, and modulated at an intermediate frequency (IF). The signal, now at IF, passes through predistorter 22 and AM/AM and AM/PM distortions are corrected in the manner discussed below. The signal is upconverted, amplified, filtered, and transmitted from antenna 26 on a frequency f1. At the second transmitter/receiver 10 the signal on frequency f1 is received, downconverted, demodulated, demultiplexed and provided as an output signal.

Demodulator 30 at the second transmitter/receiver 10 evaluates the received signal without resort to an original signal because the original signal was only provided to the first transmitter/receiver 10) to determine whether and how many nonlinearities are present and generates nonlinearity corrections, if needed. Collectively, the number of nonlinearities and nonlinearity corrections may be denoted nonlinearity data. The nonlinearity data are provided to multiplexer 18 through a reverse channel connection 36. Multiplexer 18 sends the nonlinearity data to antenna 26 where it is transmitted on a frequency f2 back to the first transmitter/receiver 10.

At the first transmitter/receiver 10 the received nonlinearity data is demodulated, demultiplexed and provided to controller 34 through a reverse channel connection 38. The nonlinearity data are interpreted in controller 34 and provided to predistorter 22 to correct signals being transmitted from the first transmitter/receiver 10.

Demodulator 30 may include a processor for extracting nonlinearity information. The processor looks at the received signal to determine whether the data therein may have a nonrandom distribution. That is, if the data is not being influenced by a nonlinearity, the data will have a random distribution that falls within a predetermined space of expected results. If the data is being influenced by a nonlinearity, the distribution of the data will tend to have a nonrandom characteristic due to the nonlinearity. The nonrandomness of the data may be detected if when the distribution of data falls outside a the predetermined space of expected results.

By way of further explanation, consider packages of data arriving that each include a most significant bit (msb), a least significant bit (lsb), and plural bits following the least significant bit, the first following bit being denoted a state-splitting bit (ssb) and the next following bit being denoted a pseudo-splitting bit (psb). The two following bits may be exclusive-or-ed. Each data set may be defined by these bits (or other predetermined bits) joined together to form a constellation point in a $2^N$-QAM constellation, where N is an integer from four to eight. In the absence of nonlinearities, the constellation point (cp) for each data set will fall within a defined space, such as space A in FIG. 2. Space A may be defined to include all expected constellation points when nonlinearities are not present. If nonlinearities are present, the constellation points will begin to move out of space A and into a surrounding space B, where the width of space B may be twice the width of space A. When a constellation point is in space B, the processor may indicate a count at time To and latch the nonlinearity data at time T1. The process may continue with the result being a zero count when the BER is good and a higher count as the signal degrades. The process may evaluate both I and Q axes of data.

As discussed above, when the count is zero, the constellation is good, causing the BER is to be good. In a preferred embodiment a BER of $10^{-12}$ may be achieved (i.e., $10^{12}$ bits per error), that results in an almost perfect quadrature constellation. When imperfections such as nonlinearities occur, the constellation points begin to shift from their defined space and the residual BER begins to degrade (fewer bits per error). The counts from both the I and Q axes are sampled and fed to the predistorter. The predistorter changes the phase and/or amplitude as needed, and another count is taken. Each change made and the resulting count are placed in a memory. The process is repeated and the processor determines which correction provides the count closest to zero (best performance). As the number of samples increases and the count improves, the predistorter converges on optimum performance.

A preferred embodiment of the present invention is illustrated in FIG. 3 in which numerical designations for similar features from FIG. 1 have been retained to facilitate and understanding thereof. Predistorter 22 may include a nonlinear operator 40 for generating third order intermodulation products of the input signal, an attenuator 42 having a 50 dB gain stage responsive to nonlinearity correction, a phase shifter 44 for rotating the signal to any desired phase responsive to the nonlinearity correction, and a summer 46 for adding the nonlinear corrections to the original signal. The extraction of the nonlinearity data discussed above takes place in processor/memory 48. The nonlinearity data therefrom is provided through a serial line 50 (e.g., an RS-485 serial line) to a controller unit 52. Controller unit 52 decodes the data and forwards it to multiplexer 18 through reverse channel 54 that may be further controlled by a serial line for transmission on frequency f2 back to the originator of the signal. At the signal originator, the data are demultiplexed in demultiplexer 32 and provided to the controller unit 52 through a reverse channel 56. Controller unit 52 is linked to controller 34 (denoted an RPC unit) through an FSK link 58. RPC unit 34 interprets the nonlinearity data and provides instructions to predistorter 22 to vary amplitude and phase as needed.

As is apparent, the system on both f1 and f2. That is, predistorter 22 at the signal originator will correct for nonlinearities in the f1 frequency channel, and predistorter 22 at the signal recipient will correct for nonlinearities in the f2 frequency channel (by which the nonlinearity corrections are provided back to the signal originator.)

The preferred embodiment of FIG. 3 may be used in a microwave relay system in which transmitter/receivers 10 are about 50 kilometers apart for input signals with 2 GHz bands. The IF frequency is 70 MHz. The input data stream may include a main channel of data, wayside channel, and other channels as appropriate. Correction signals are transmitted over the hop between pairs of transmitter/receivers 10.

In an alternative embodiment, the evaluation of the nonlinearities without resort to the original signal may be performed at a site in the system other than the receiver. For example, the evaluation may be performed at the originator of the signal in a unit that may be separate from the transmitter.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An improved method of predistorting a signal before transmission of the signal to compensate for nonlinearities introduced when the signal is transmitted to a receiver, the improvement comprising the steps of:

(a) evaluating a received signal at a receiver to determine whether the received signal includes nonlinearities, said evaluation including the step of identifying a nonrandom distribution of data in the received signal, the nonrandom distribution being indicative of a nonlinearity; and (b) providing a result of the evaluation back to a transmitter that sent the received signal, the result being used at the transmitter to predistort signals before transmission therefrom.

2. The method of claim 1 wherein the received signal comprises data bits and selected ones of the data bits define a constellation point, and further comprising the step of determining whether a constellation point is in an area associated with random distribution of constellation points.

3. A method of predistorting an RF signal to compensate for nonlinearities introduced when the RF signal is communicated, the method comprising the steps of:
 (a) transmitting an RF signal from a first transmitter/receiver to a second transmitter/receiver on a first frequency;
 (b) extracting nonlinearity data from the RF signal received at the second transmitter/receiver by
  defining the nonlinearity data as constellation points related to data bits in the received RF signal;
  defining an area for the constellation points that indicates when a nonlinearity has occurred; and
  detecting when the constellation points fall into the defined area;
 (c) transmitting a further RF signal containing the nonlinearity data from the second transmitter/receiver to the first transmitter/receiver on a second frequency; and
 (d) redistorting RF signals to be transmitted from the first transmitter/receiver on the first frequency by using the received nonlinearity data.

4. The method of claim 3 wherein the step of predistorting RF signals comprises the step of:
 applying predistortion corrections to RF signals to be transmitted after a predetermined number of the detections.

5. The method of claim 4 wherein the step of predistorting RF signals further comprises the steps of:
 storing plural of the predistortion corrections that have been applied to RF signals and a corresponding number of the detections resulting therefrom; and
 applying to RF signals to be transmitted a one of the plural predistortion corrections that provides an acceptable number of the detections.

6. The method of claim 5 wherein the steps of claim 4 are repeated in order to identify a one of the predistortion corrections that provides the least number of the detections.

7. A method of predistorting an RF signal to compensate for nonlinearities introduced when the RF signal is communicated, the method comprising the steps of:
 (a) transmitting an RF signal from a first transmitter/receiver to a second transmitter/receiver on a first frequency;
 (b) extracting nonlinearity data from the RF signal received at the second transmitter/receiver;
 (c) transmitting a further RF signal containing the nonlinearity data from the second transmitter/receiver to the first transmitter/receiver on a second frequency; and
 (d) predistorting RF signals to be transmitted from the first transmitter/receiver on the first frequency by using the received nonlinearity data;
 (e) extracting further nonlinearity data from the further RF signal received at the first transmitter/receiver;
 (f) transmitting the further nonlinearity data from the first transmitter/receiver to the second transmitter/receiver on the first frequency; and
 (g) predistorting RF signals to be transmitted from the second transmitter/receiver on the second frequency by applying the received further nonlinearity data thereto.

8. A method of predistorting an RF signal to compensate for nonlinearities introduced when the RF signal is communicated, the method comprising the steps of:
 (a) transmitting an RF signal from a first transmitter/receiver to a second transmitter/receiver on a first frequency;
 (b) extracting nonlinearity data from the RF signal received at the second transmitter/receiver;
 (c) transmitting a further RF signal containing the nonlinearity data from the second transmitter/receiver to the first transmitter/receiver on a second frequency; and
 (d) predistorting RF signals to be transmitted from the first transmitter/receiver on the first frequency by using the received nonlinearity data, said predistorting comprising the steps of receiving the nonlinearity data at a receiver unit and providing the nonlinearity data to a predistorter in a transmitter unit through a reverse channel connection between the receiver and transmitter units.

9. A method of predistorting an RF signal to compensate for nonlinearities introduced when the RF signal is communicated, the method comprising the steps of:
 (a) transmitting an RF signal from a first transmitter/receiver to a second transmitter/receiver;
 (b) extracting nonlinearity data from the RF signal received at the second transmitter/receiver by the steps of,
  (i) defining the nonlinearity data as constellation points related to data bits in the received RF signal,
  (ii) defining an area for the constellation points that indicates when a nonlinearity has occurred, and
  (iii) detecting when the constellation points fall into the defined area;
 (c) transmitting a further RF signal containing the nonlinearity data from the second transmitter/receiver to the first transmitter/receiver; and
 (d) predistorting RF signals to be transmitted from the first transmitter/receiver responsive to the received nonlinearity data.

10. The method of claim 9 wherein the constellation points are in an $2^N$-QAM constellation, where N is an integer from four to eight.

11. The method of claim 10 wherein the data bits to which the constellation points are related include the two bits immediately following a least significant bit of a package of data in the received RF signal.

12. The method of claim 9 wherein the RF signal is transmitted on a first frequency and the further RF signal is transmitted on a second frequency.

13. A method of predistorting an RF signal to compensate for nonlinearities introduced when the RF signal is communicated, the method comprising the steps of:
 (a) transmitting an RF signal from a first transmitter/receiver to a second transmitter/receiver on a first frequency;
 (b) extracting nonlinearity data from the RF signal received at the second transmitter/receiver, the nonlinearity data including a count of a number of nonlinearities and nonlinearity corrections;
 (c) communicating the nonlinearity data from a receiver unit in the second transmitter/receiver to a transmitter unit in the second transmitter/receiver through a reverse channel connection between the receiver and transmitter units;
 (d) transmitting a further RF signal containing the nonlinearity data from the transmitter unit to the first transmitter/receiver on a second frequency; and
 (e) communicating the nonlinearity data from a further receiver unit in the first transmitter/receiver to a further transmitter unit in the first transmitter/receiver through a reverse channel connection between the further receiver and transmitter units;

(f) predistorting RF signals to be transmitted from the further transmitter unit on the first frequency by using the received nonlinearity data.

14. The method of claim 13 wherein the step of extracting nonlinearity data comprises the steps of;

defining the nonlinearity data as constellation points;

defining an area for the constellation points that indicates when a nonlinearity has occurred; and detecting when the constellation points fall into the defined area to provide the count of nonlinearities.

15. The method of claim 14 wherein the step of predistorting RF signals further comprises the steps of:

storing plural of the predistortion corrections that have been applied to RF signals and a corresponding count resulting therefrom; and applying to RF signals to be transmitted a one of the plural predistortion corrections that provides an acceptable count.

16. A signal transmission system for predistorting a signal to compensate for nonlinearities in the communicated signal, the system comprising a processor for evaluating whether an output signal includes nonlinearities without reference to an input signal from which the output signal was derived, and a predistorter for applying results from said processor to a further input signal.

17. The system of claim 16 wherein said processor comprises means for identifying a nonrandom distribution of data in the output signal, the nonrandom distribution being indicative of a nonlinearity.

18. The system of claim 17 wherein the output signal comprises data bits and selected ones of the data bits define a constellation point, and further comprising means for determining whether a constellation point is in an area associated with random distribution of constellation points.

19. A signal transmission system for predistorting a signal to compensate for nonlinearities in the communicated signal, the system comprising plural transmitter/receivers, each of which comprises a transmitter unit and a receiver unit:

said transmitter unit comprising, a multiplexer for accepting input signals and for receiving nonlinearity information in a reverse channel connected to said receiver unit, a predistorter for applying the nonlinearity information to the input signals, an interpreter for receiving the nonlinearity information from said receiver unit and providing it in useable form to said predistorter, and a transmitter for transmitting the input signals on a first frequency and for transmitting the nonlinearity information on a second frequency; and said receiver unit comprising, a receiver for receiving the input signals on the first frequency and for receiving the nonlinearity information on the second frequency, a demodulator with a processor for extracting the nonlinearity information from the received input signals, a controller unit for providing the nonlinearity information from said demodulator through said reverse channel to said multiplexer for transmission by said transmitter on the second frequency and to said interpreter for application in said predistorter.

20. The system of claim 19 wherein said processor comprises a counter for counting occurrences of nonlinearities in the received input signals, and means for generating a nonlinearity correction, and wherein the nonlinearity information includes the count and the nonlinearity correction.

21. A method of predistorting an RF signal to compensate for nonlinearities introduced when the RF signal is communicated, the method comprising the steps of:

(a) transmitting an RF signal from a first transmitter/receiver to a second transmitter/receiver on a first frequency;

(b) extracting nonlinearity data from the RF signal received at the second transmitter/receiver, said extracting performed in a receiver unit;

(c) transmitting a further RF signal containing the nonlinearity data from the second transmitter/receiver to the first transmitter/receiver on a second frequency, said transmitting performed in a transmitter unit;

(d) communicating the nonlinearity data from the receiver unit to the transmitter unit through a reverse channel connection between the receiver and transmitter units; and (e) predistorting RF signals to be transmitted from the first transmitter/receiver on the first frequency by using the received nonlinearity data.

* * * * *